United States Patent
Erikson et al.

(12) 
(10) Patent No.: US 6,415,673 B1
(45) Date of Patent: Jul. 9, 2002

(54) REINFORCED LEAD SCREW WITH ANTI-BACKLASH NUT

(75) Inventors: Keith W. Erikson, Hollis; Kenneth W. Erikson, Amherst, both of NH (US)

(73) Assignee: Kerk Motion Products, Inc., Hollis, NH (US)

( * ) Notice: Subject to any disclaimer, the term of this patent is extended or adjusted under 35 U.S.C. 154(b) by 0 days.

(21) Appl. No.: 09/643,051

(22) Filed: Aug. 21, 2000

Related U.S. Application Data

(63) Continuation-in-part of application No. 09/336,905, filed on Jun. 21, 1999, now Pat. No. 6,202,500, which is a continuation-in-part of application No. 08/842,849, filed on Apr. 17, 1997, now Pat. No. 5,913,941.

(51) Int. Cl.[7] ............................................. F16H 27/02
(52) U.S. Cl. ................. 74/89.42; 74/424.94; 74/424.95
(58) Field of Search ............................ 74/89.32, 89.33, 74/89.36, 89.42, 424.94, 424.95

(56) References Cited

U.S. PATENT DOCUMENTS

| | | |
|---|---|---|
| 3,372,605 A | 3/1968 | Orner |
| 4,131,031 A | 12/1978 | Erikson et al. |
| RE31,713 E | 10/1984 | Erikson et al. |
| 4,566,345 A | 1/1986 | Erikson et al. |
| 5,079,963 A | 1/1992 | Yamamoto et al. |
| 5,689,997 A | 11/1997 | Schaller |
| 5,761,960 A | 6/1998 | Nagai et al. |
| 5,852,949 A | 12/1998 | Cartensen |
| 5,937,702 A | 8/1999 | Erikson et al. |

FOREIGN PATENT DOCUMENTS

| | | |
|---|---|---|
| EP | 0 529 563 A2 | 8/1992 |
| EP | 0 559 441 A1 | 3/1993 |
| EP | 0 577 390 A2 | 6/1993 |

*Primary Examiner*—David Fenstermacher
(74) *Attorney, Agent, or Firm*—Hamilton, Brook, Smith & Reynolds, P.C.

(57) ABSTRACT

An anti-backlash nut is assembled on a reinforced lead screw for bilateral motion lengthwise of the lead screw as the screw is rotated. A hollow, elongate reinforcing rail extends lengthwise of and surrounds the lead screw. A slot in the rail extends lengthwise of the central axis of the lead screw. The anti-backlash nut comprises two separate portions, each portion having a tongue which extends radially through the slot and has threads engageable with the threads of the lead screw for moving both nut portions in reciprocating motion lengthwise of the rail when the screw is rotated. Spring means are employed for forcing the nut portions apart to urge the flanges of their threads into forcible engagement with the threads of the lead screw to prevent backlash, while the anti-backlash nut translates laterally along the reinforcing rail.

25 Claims, 5 Drawing Sheets

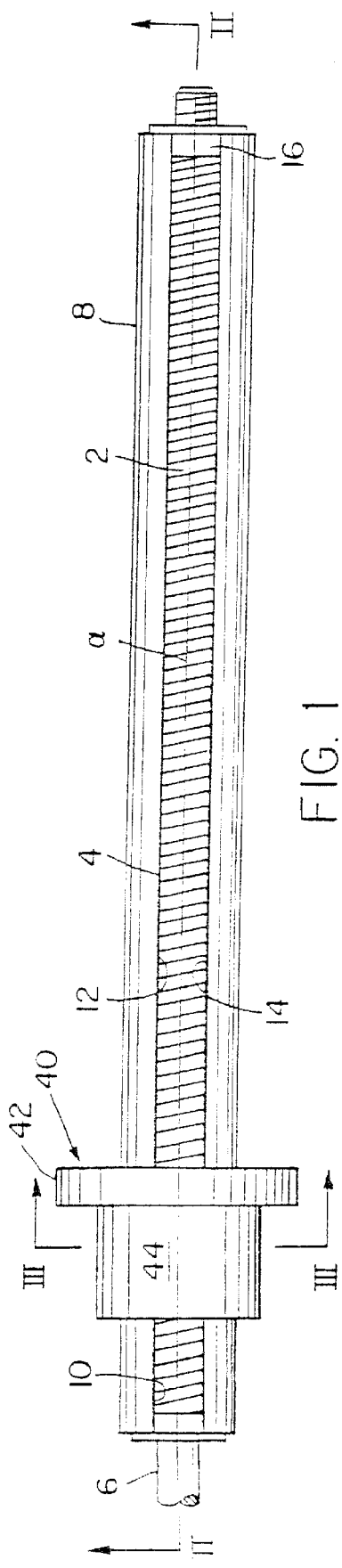
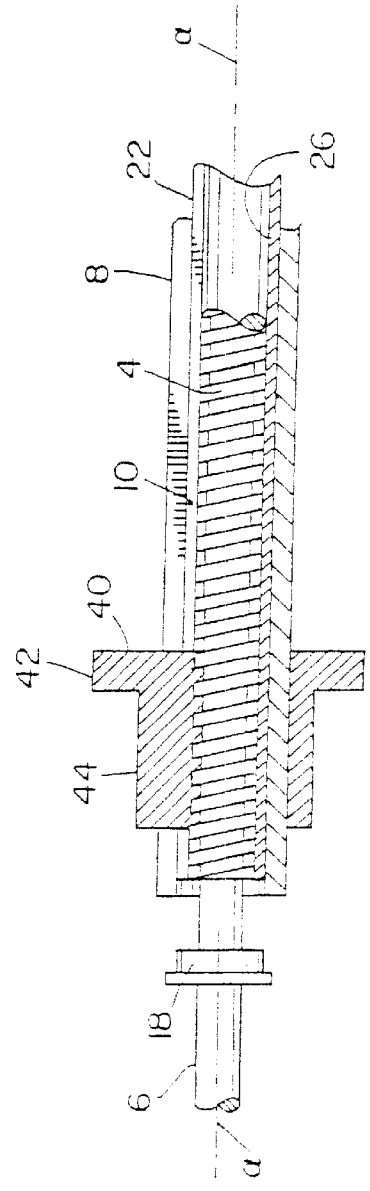
FIG. 1
FIG. 2

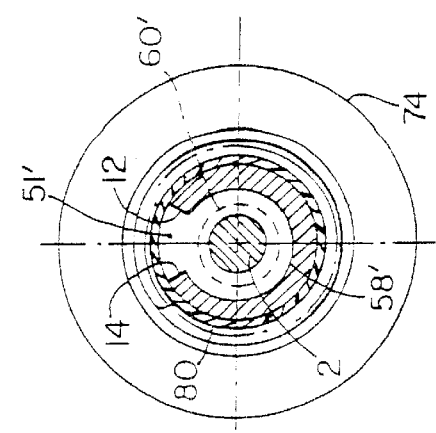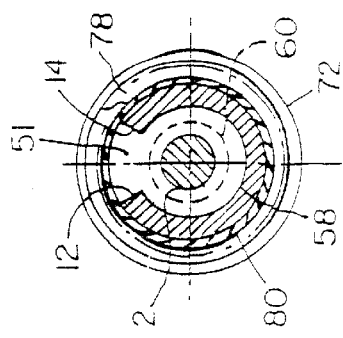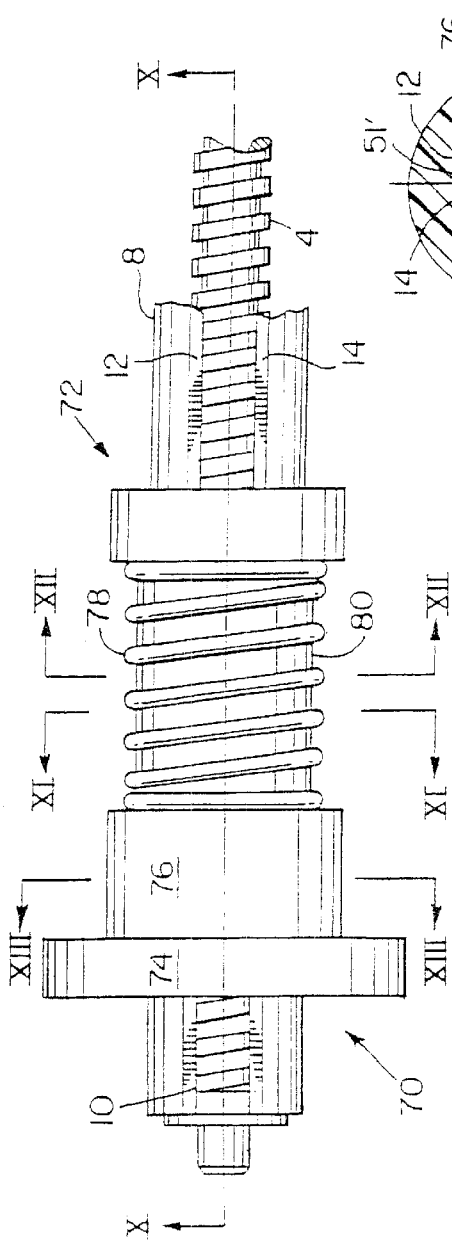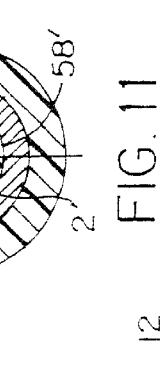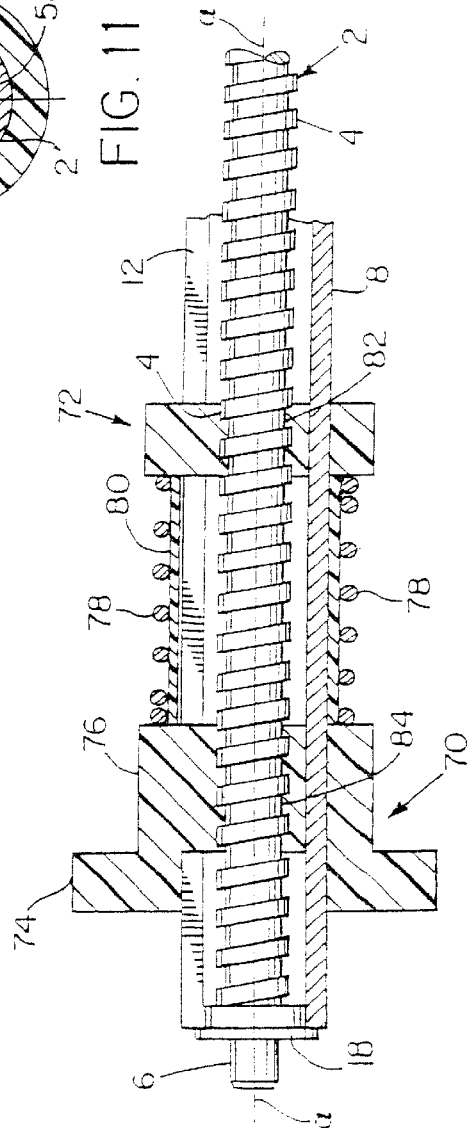

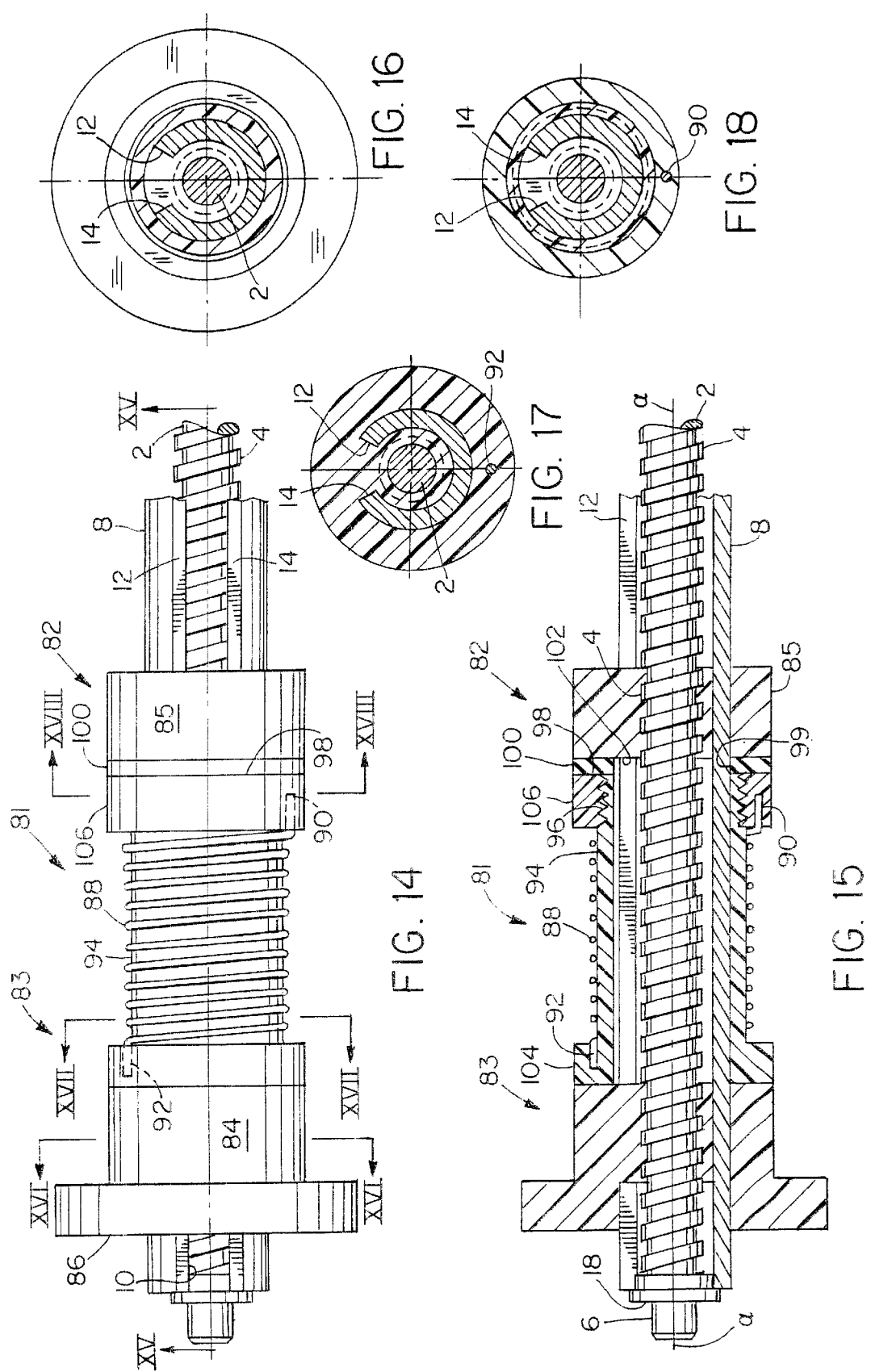

REINFORCED LEAD SCREW WITH ANTI-BACKLASH NUT

RELATED APPLICATIONS

This application is a Continuation-in-Part of application Ser. No. 09/336,905 filed Jun. 21, 1999 now U.S. Pat. No. 6,202,500 which is a Continuation-in-Part of Ser. No. 08/842,849 filed Apr. 17, 1997, now U.S. Pat. No. 5,913,941, the contents of the which are incorporated herein by reference in their entirety.

BACKGROUND OF THE INVENTION

U.S. Pat. No. 4,566,345, issued Jan. 26, 1986 to the present inventors and disclosed a carrier for mounting a tool for reciprocating motion along a pair of spaced, parallel guide rails. The carrier itself is reciprocated bilaterally by a rotating lead screw extending lengthwise between and parallel to the guide rails. The lead screw engages an internally threaded nut on the carrier. The nut may be an anti-backlash nut and will be so illustrated hereinafter. With the lead screw located between the rails, there are bearing supports extending laterally from the carrier, each mounting a bearing which slides on a guide rail much in the manner of outrigger pontoons.

The rails serve a number of purposes. They create a low-friction guideway for the carrier to ride on but, more importantly, they create an anti-rotation mechanism for the carriage. If there were no guide rails and the carrier were mounted on the lead screw only, the carrier probably would not reciprocate. This is because the mass of the carrier would create high frictional resistance between its threaded nut and the lead screw such that the carrier would rotate with the lead screw rather than traversing it. Secondly, again, if there were no guide rails and if the lead screw were oriented in a horizontal direction, the flexure of the lead screw, created by the weight of the carrier and the tool that it mounts, could cause the carrier to bind on the lead screw and/or cause the tool that it mounts to disengage from its workpiece.

Yet another problem can exist. Tools mounted on the carrier are normally offset from the central axis of the lead screw. In addition, the tools are mounted on posts in a cantilevered position relative to the carrier. Normal drag of the tool relative to its workpiece creates a torque which is imparted through the tool post to the carrier and, hence, to the supports riding on the rails which carry the bearings. This can cause unnecessary drag, monkey-biting, or can conceivably result in the lead screw's driving motor to stall out.

Another shortcoming in certain applications where space is limited is the size of the mechanism. Two guide rails spaced laterally of a lead screw creates a drive mechanism which is spread out, generally horizontally, and, in some machine operations, there is not sufficient space to do this. In addition, it is difficult to obtain initial alignment of the screw and two parallel rails.

It is to the solution of these problems that the present invention is directed.

SUMMARY OF THE INVENTION

The invention resides in a reinforced lead screw assembly which includes a threaded lead screw rotatable about a central axis by a reversible motor. Surrounding the lead screw is a rigid, hollow, elongate reinforcing rail or tube which extends lengthwise end to end of the screw. A two-part anti-backlash nut is movable along the reinforcing rail and is driven by the screw. There is a slot in the reinforcing rail which extends lengthwise of the central axis of the lead screw. Projections or tongues on both portions of the nut extend in a radial direction through the slot in the reinforcing rail and are engageable with the walls of the slot to prevent rotation of the anti-backlash nut relative to the rail. The tongues or projections mount threads which are engageable with the threads of the lead screw. Consequently, when the lead screw is rotated in either direction, the nut will translate lengthwise of the screw.

A sleeve bearing is insertable in the reinforcing rail or tube which bearing is made of low-friction, plastic material and engages the threads of the lead screw to offer lateral support in cooperation with the reinforcing rail itself.

The projections on the nut portions have either partial threads engageable with the threads of the lead screw or mount circular hubs which are internally threaded to engage the lead screw.

The reinforcing rail may include at least one flat extending lengthwise which is engageable with mating flats on the nut portion to supplement the anti-rotation function of the tongue and the slot in the rail to prevent the nut from rotating relative to the reinforcing rail. The outer surface of the reinforcing rail may be coated with a low-friction material such as PTFE, Nylon or the like. The anti-backlash nut also may be made of self-lubricating material such as acetyl and may include PTFE carbon fiber additive or other lubricating additives for low frictional engagement with the lead screw. It may be molded around or attached to a ball bushing for added stiffness and lubricity. The sleeve bearing located within the lead screw may be made of Nylon, Delrin or like plastic material.

Spring means such as compression springs or torsion springs force the nut halves or portions apart to urge the flanks of their threads into forcible engagement with the flanks of the threads of the lead screw to prevent backlash while the nut translates laterally along the reinforcing rail in both directions.

The above and other features of the invention including various and novel details of construction and combination of parts will now be more particularly described with reference to the accompanying drawings and pointed out in the claims. It will be understood that the particular reinforced lead screw embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG 1. is a plan view of a reinforced lead screw embodying the present invention.

FIG. 2 is a partial sectional view taken along the lines II—II on FIG. 1.

FIG. 9 is a plan view of reinforced lead screw mounting an anti-backlash nut.

FIG. 10 is a view, partially in section, taken along the line XX of FIG. 9.

FIG. 11 is a sectional view, taken along the line XI—XI of FIG. 9.

FIG. 12 is a sectional view, taken along the line XII—XII of FIG. 1, and

FIG. 13 is a sectional view, taken along the line XIII—XIII of FIG. 9.

FIG. 14 is a plan view, similar to FIG. 9, of another embodiment of the invention showing a reinforced lead screw mounting anti-backlash nut of a different construction.

FIG. 15 is a view, partially in section, taken along the line XV—XV of FIG. 14.

FIG. 16 is a sectional view taken along the line XVI—XVI of FIG. 14.

FIG. 17 is a sectional view taken along the line XVII—XVII of FIG. 14.

FIG. 18 is a sectional view, taken along the line XVIII—XVIII of FIG. 14.

DETAILED DESCRIPTION OF THE INVENTION

Figure 3:
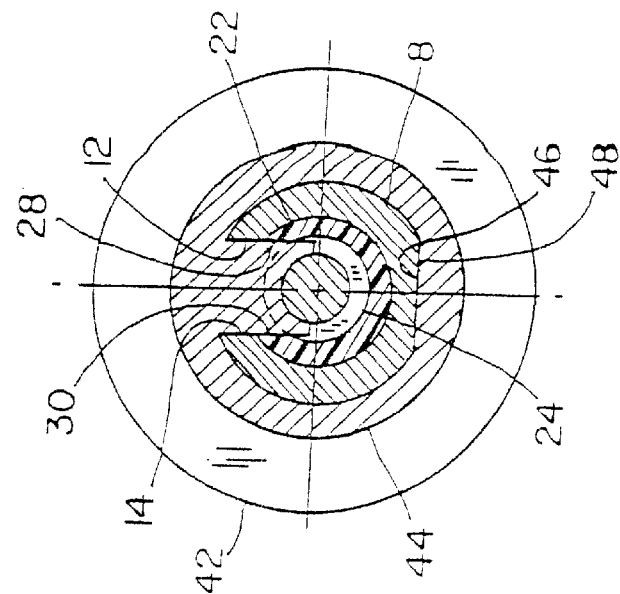
FIG. 3 is a sectional view through the reinforced guide rail and the nut-bearing taken along the lines III—III on FIG. 1 with the lead screw and reinforcing rail removed.

The reinforced lead screw is seen assembled in plan view in FIG. 1. It comprises a screw 2 rotatable about an axis α and having threads 4 formed along its length. A projection 6 extends is formed on one end of the lead screw to connect it to a reversible driving motor (not shown) in order to rotate the lead screw alternatively in clockwise and counterclockwise direction.

Surrounding lead screw 2 is an elongate reinforcing rail 8 or tube which extends lengthwise of the screw. The reinforcing rail is hollow to accommodate the lead screw and includes a slot 10 extending lengthwise and parallel to the central axis α of the lead screw. The slot includes side walls 12 and 14 (FIGS. 3 and 5) which may constitute bearing surfaces as will be explained in further detail hereinafter. The lead screw is journaled within the reinforcing rail by bearings 16 and 18 for rotation relative to the reinforcing rail.

With reference to FIG. 2, there will be seen an elongate sleeve bearing 22 extending lengthwise of the reinforcing rail. The bearing is made of a low-friction plastic such as PTFE, Nylon or Delrin and has a circular interior and engages the threads 24 of the lead screw. It functions as a radial support for the lead screw preventing the screw from whipping or vibrating as it is rotated.

The sleeve bearing 22 includes a slot 26 (FIG. 2) having sidewalls 28 and 30 (FIG. 3) which, when assembled in the rail 8, are essentially continuations of the sidewalls 12 and 14, respectively, of the slot 10 in the reinforcing rail. The slots 10 and 26 are aligned with each other.

In operation, the reinforcing guide rail 8 would be secured in a machine structure by any convenient means (not shown) with a reversible driving motor attached to the lead screw 2.

A nut-bearing, generally indicated 40, which may be metal or, preferably, moldable plastic such as acetyl with carbon filter additives is movable in bilateral direction along the reinforcing rail. The nut-bearing may optionally have anti-backlash properties. The nut-bearing includes a flange 42 which is illustrated as circular but may be constructed in any convenient shape depending on the tool or load to be attached. The nut-bearing includes a body portion 44 and which, as will be seen in FIG. 4, is provided with an optional internal flat 46 which is engageable with an optional mating flat 48 formed on the bottom of the reinforcing rail (FIG. 3).

The element 40 is called a nut-bearing because it functions as both. It functions as a nut because, as will be seen hereinafter, it is internally threaded and is moved by the lead screw. Secondly, it has internal bearing surfaces and slides on the rail.

Figure 5:
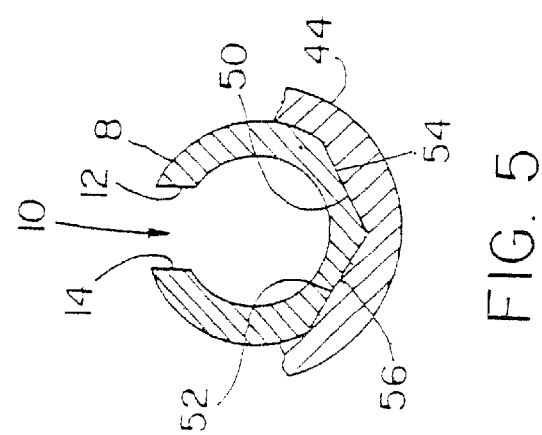
FIG. 5 is a schematic sectional view of part of the guide rail and the nut-bearing illustrating another embodiment of the flats.

As will be seen in FIG. 5, a plurality of flats 50 and 52 (hereinafter illustrated as only 2) may be formed in the nut-bearing which are engageable with mating flats 54 and 56 on the reinforcing rail 8.

Figure 4:
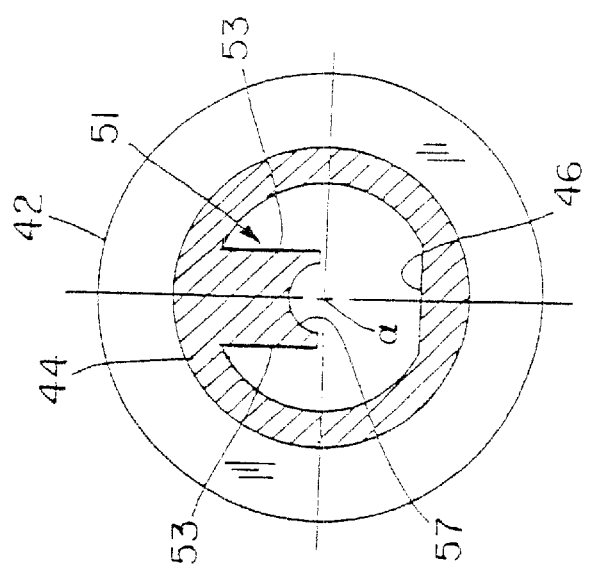
FIG. 4 is a view similar to FIG. 3 with the lead screw and the reinforcing rail removed and having one flat on the nut-bearing.

As will be seen in FIG. 4, the nut-bearing 40 includes a projecting portion or tongue 51 extending radially inwardly. It has parallel sides 53 which are engageable with the sides 12, 14, 28 and 39 of the aligned slots 10 and 26 formed in the guide rail 8 and the bearing 22, respectively. This engagement also assures that, in addition to the functioning of flats 46, 48, the nut will not rotate relative to the guide rail 8 when the lead screw is rotated.

The purpose of the optional flats 50, 42, 54, 56, be there one or a plurality, is to supplement the anti-rotational function of the tongue 51 and the slots 10 and 26 in preventing the nut 40 from rotating relative to the reinforcing rail 8 when the lead screw 2 is rotated. This could be the case where the frictional engagement between the threads of the lead screw and the nut is greater than the frictional engagement between the nut and the exterior of the guide rail.

Arcuate threads 57 (FIG. 3) are located at the innermost end of the projection 51. The threads are engageable with the threads 4 of the lead screw 2 such that when the lead screw is rotated, either clockwise or counterclockwise, the nut-bearing 40 will translate relative to the reinforcing rail 8.

Figure 7:
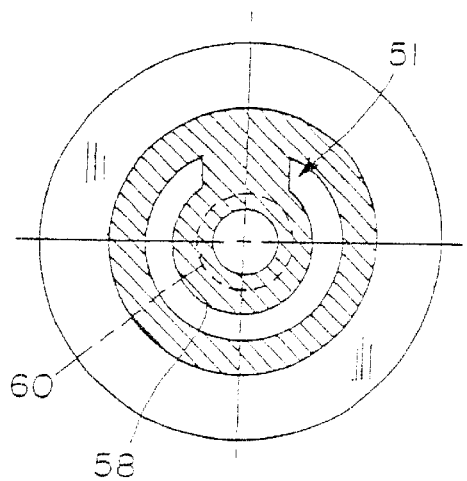
FIGS. 7 and 8 are views similar to FIGS. 3 and 4, respectively, of an alternative construction of the nut-bearing.
Figure 8:
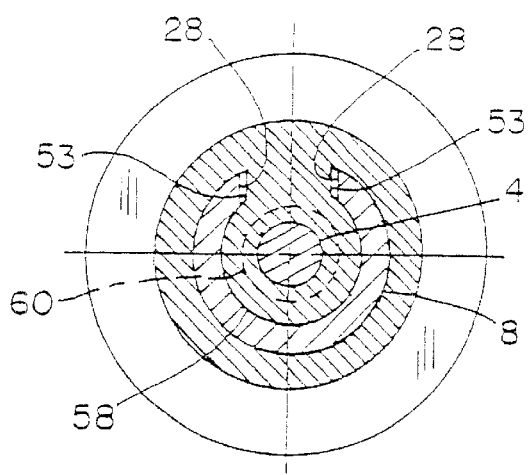

As will be seen in FIGS. 7 and 8, an alternative construction of the nut-bearing 40 will be seen. A circular hub portion 58 is formed on the torque or projection 51 and it has internal threads 60 (FIG. 8) which encircle and engage the threads 24 of the lead screw 2. In FIG. 8, the sides 28 of the slot of the reinforcing rail 8 are shown separated from the sides 53 of the projection 51. This is optional construction. The internal threads 60 of the hub 58 are in mating engagement with the threads of the lead screw.

Functionally, the FIG. 7 embodiment of the nut operates in the same manner as the FIG. 3 embodiment.

Figure 6:
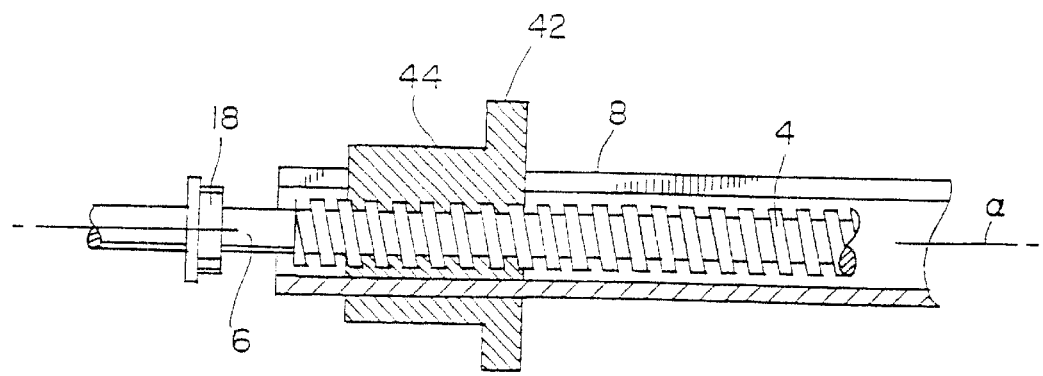
FIG. 6 is a sectional view similar to FIG. 2 with the sleeve bearing removed.

FIG. 6 is a view similar to FIG. 2 with the sleeve bearing 22 removed. If a high degree of flexure of the lead screw were anticipated, this would not be done or, conversely, the reinforcing rail 8 would be constructed with a smaller diameter such that it could engage the crests of the threads formed on the lead screw. Furthermore, the longer the lead screw is, the more need there is for the reinforcing bearing to support the lead screw against whipping.

With the present invention, there is no need for lateral guide rails for the nut, or if a carriage is attached, to ride on, since the reinforcing rail 8 is generally sufficient except in very large tool requirements. Since the breadth of the single rail construction is smaller, there is less chance for canting or skewing of the nut because its load can be mounted closer to the axis α. Circular loads can also be attached to the nut 44 surrounding the reinforced lead screw where there would be little or no torque applied to the nut to cause it to bind on the guide rail 8.

Referring to FIG. 13, a two-part anti-backlash nut will be seen mounted on the reinforcing rail 8 for bilateral reciprocating motion imparted by the rotatable lead screw 2. The anti-backlash nut comprises two separated nut halves 70 and 72. The nut half 70 has a cylindrical hub portion 76 and a larger diameter flange portion 74. The flange 18 may also be called a face plate. The nut half 70 through the flange 74 may be bolted onto a load which, with the nut, is reciprocated back and forth by the reinforced lead screw. An open-wound, coiled compression spring 78 is positioned around the outside of a tubular spacer 80. One end of the spring 78 abuts the nut half 72 and the other end abuts the hub portion 76 of the nut half 70. The central portion of the nut half 72 is threaded to mesh with and rotatably engage the threads 4 of the lead screw 2, as will be described in greater detail hereinafter. The nut halves are urged in opposite directions to ensure good anti-backlash contact with the flanks of the threads 4 of the lead screw.

As hereinbefore described with reference to the nut-bearing 40, the nut half 72 includes a tongue 51 extending radially downwardly and inwardly, engaging the sidewalls 12 and 14 of the reinforcing rail 8. A circular hub 58 is formed on the tongue 51 and has internal threads 60 which are in mating engagement with the threads 4 of the lead screw 2. While longitudinal movement is imparted to the nut half 72 by rotation of the lead screw 2, engagement of the tongue 51 with the sides 12 and 14 of the slot in the reinforcing rail 8 prevents the nut half from rotating.

The interior of the hub 76 of the nut half 70 is constructed in similar fashion as will be seen in FIGS. 11 and 13. A tongue 51' extends into the slot 10 if the reinforcing rail 8 and engages the sidewalls 12 and 14. A similar circular hub 58' has interior threads 60' which likewise engage the threads 4 of the rotatable lead screw.

As with the tongue 51, rotation of the nut halves 70, 72 is prevented by the tongue 51' engaging the walls 12 and 14 of the slot 10 of the lead screw, while the compression spring 80 forces the nut halves 70, 72 apart with their threads urged firmly into engagement with the flanks of the threads 4 of the lead screw to prevent backlash while the anti-backlash nut translates bilaterally along the reinforcing rail 8.

Referring next to FIGS. 14–18, another embodiment of an anti-backlash nut mounted on the reinforcing rail 8 will be illustrated. A two part, split, anti-backlash nut 81 is mounted for bilateral reciprocating motion on the rail 8 imparted by the rotatable lead screw 2. The nut 81 comprises essentially two separated compound nut halves 82 and 83. The nut half 83 has an internally threaded cylindrical hub portion 84 and an attached, larger diameter flange portion 86. As with the previously described FIG. 9 embodiment, the flange 86 may also be called a face plate. It may be bolted to a load which, with the combined nut 81 is reciprocated back and forth by the reinforced lead screw 2. An open-wound, coiled torsion spring 88 with tangs 90 and 92 at its ends surrounds a tubular spacer 94, one end of which abuts the nut half 83. The other half is threaded at 96, and terminates in a face 98 which engages an anti-friction member 98 in the form of a high-friction elastomeric washer 100. The washer has a circular concentric opening 99 which fits around the reinforcing rail 8 such that the elastomeric washer 100 may be slid over the rail during assembly. The high-friction elastomeric washer 100, when assembled, abuts the face 102 of nut half 82.

Each of the nut halves 82 and 83 is threaded onto the lead screw 2, as shown in FIG. 15 and will be described in greater detail hereinafter. The tang 92 of the torsion spring 88 is inserted into a recess in the collar portion 104 threaded on the spacer 94. A corresponding collar 106 is threaded onto the threads 96 of the spacer 94. The torsion spring 88 is given a twist with the other tang 90 inserted in a bore preformed in the collar 106. The high-friction elastomeric washer 100, when assembled as shown in FIG. 15, is located between the face 98 of the collar 106 and a face 102 on a cylindrical, internally threaded, portion 85 of the nut half 82. With the parts assembled as shown in FIG. 15, the torsion spring 88 continuously urges the nut halves apart to take up any slack between the flanks of the threads 4 on the lead screw and the internally threaded portions of the nut halves 82 and 83. Hence there will be no lost movement because the thread flanks are at all times in intimate contact regardless of the direction of movement.

The torsion spring's ability to rotate one nut half with respect to the other maintains intimate contact between the nut half collar 106 with the elastomeric friction washer 100 and the thread flanks of the nut halves with the engaged thread flanks of the lead screw 2. The high-friction elastomeric washer 100 limits the relative rotational movement between the collar 106 and the back portion 85 of the nut halves when they are in the closed position to prevent backlash from reoccurring.

The invention claimed is:

1. A reinforced lead screw assembly comprising:
   a threaded lead screw rotatable about a central axis;
   a hollow, elongate reinforcing rail extending lengthwise of and surrounding the lead screw;
   a slot in the reinforcing rail extending lengthwise of the central axis;
   a nut-bearing moveable along the reinforcing rail;
   a portion of the nut extending through the slot;
   internal threads on the extending portion of the nut-bearing engageable with the threads on the lead screw for moving the nut-bearing in reciprocating motion lengthwise of the rail when the lead screw is rotated wherein the nut-bearing threads are formed on the portion of the nut extending through the slot in an arc.

2. A reinforced lead screw assembly according to claim 1, having at least one flat extending lengthwise of the reinforcing rail and a mating flat in the nut-bearing to prevent the nut from rotating relative to the reinforcing rail.

3. A reinforced lead screw assembly according to claim 1, having a plurality of flats extending lengthwise of the reinforcing rail and mating flats in the nut-bearing to prevent the nut from rotating relative to the reinforcing rail.

4. A reinforced lead screw assembly comprising:
   a threaded lead screw rotatable about a central axis;
   a hollow elongate reinforcing rail extending lengthwise of and surrounding the lead screw;
   a slot in the reinforcing rail extending lengthwise of the central axis;
   an elongate bearing within the reinforcing rail having a slot aligned with the slot in the reinforcing rail;
   a nut-bearing moveable along the reinforcing rail;
   a portion of the nut extending through the slot;
   internal threads in the extending portion of the nut-bearing engageable with the threads on the lead screw for moving the nut in reciprocating motion lengthwise of the rail when the lead screw is rotated wherein the portion of the nut-bearing extending through the slots mounts a circular hub which has internal threads engageable with the threads of the lead screw.

5. A reinforced lead screw assembly comprising:
   a threaded lead screw rotatable about a central axis;
   a hollow, elongate reinforcing rail extending lengthwise of and surrounding the lead screw;

a slot in the reinforcing rail extending lengthwise of the central axis;

a nut-bearing moveable along the reinforcing rail;

a portion of the nut extending through the slot;

wherein the portion of the nut-bearing extending through the slot mounts a circular hub which has internal threads engageable with the threads of the lead screw for moving the nut-bearing in reciprocating motion lengthwise of the rail when the lead screw is rotated.

6. A reinforced lead screw assembly comprising:

a threaded lead screw rotatable about a central axis;

a hollow elongate reinforcing rail extending lengthwise of and surrounding the lead screw;

a slot in the reinforcing rail extending lengthwise of the central axis;

an elongate bearing within the reinforcing rail having a slot aligned with the slot in the reinforcing rail;

a nut-bearing moveable along the reinforcing rail;

a portion of the nut extending through the slot;

internal threads in the extending portion of the nut-bearing engageable with the threads on the lead screw for moving the nut in reciprocating motion lengthwise of the rail when the lead screw is rotated wherein the nut-bearing threads are formed on the portion of the nut extending through the slots in an arc.

7. A reinforced lead screw assembly according to claim 6, comprising at least one flat extending lengthwise of the reinforcing rail and at least one mating flat in the nut-bearing to prevent the nut from rotating relative to the reinforcing rail.

8. A reinforced lead screw assembly according to claim 6, having a plurality of flats extending lengthwise of the reinforcing rail and mating flats in the nut-bearing to prevent the nut from rotating relative to the reinforcing rail.

9. A reinforced lead screw assembly according to claim 6, wherein the sleeve-bearing has an arcuate interior engageable with the threads of the lead screw.

10. A reinforced lead screw assembly according to claim 6, wherein the sleeve-bearing is made of a low friction plastic material.

11. A reinforced lead screw assembly comprising:

a threaded lead screw rotatable about a central axis;

a hollow elongate reinforcing rail extending lengthwise of and surrounding the lead screw;

a slot in the reinforcing rail extending lengthwise of the central axis;

bearing surfaces forming the sides of the slot;

an elongate sleeve-bearing within the reinforcing rail having a slot aligned with the slot in the reinforcing rail;

a nut-bearing moveable along the reinforcing rail;

a projection on the nut extending through the aligned slots and engageable with the bearing surfaces;

threads on the nut-bearing engageable with the threads on the lead screw for moving the nut-bearing in reciprocating motion lengthwise of the rail when the lead screw is rotated wherein the projection mounts a circular hub which has internal threads engageable with the threads of the lead screw.

12. An anti-backlash nut assembly on a reinforced lead screw comprising:

a threaded lead screw rotatable about a central axis;

a hollow, elongate reinforcing rail extending lengthwise of and surrounding the lead screw;

a slot in the reinforcing rail extending lengthwise of the central axis;

an anti-backlash nut assembly having a nut moveable along the reinforcing rail;

the anti-backlash nut comprising two separate nut portions;

each nut portion having a tongue extending radially through the slot and having threads engageable with the threads of the lead screw for moving both nut portions in reciprocating motion lengthwise of the rail when the screw is rotated;

a compression spring for forcing the nut portions apart to urge the flanges of their threads into forcible engagement with the threads of the lead screw to prevent backlash while the anti-backlash nut translates laterally along the reinforcing rail.

13. A reinforced lead screw assembly comprising:

a threaded lead screw rotatable about a central axis;

a hollow elongate reinforcing rail extending lengthwise of and surrounding the lead screw;

a slot in the reinforcing rail extending lengthwise of the central axis;

bearing surfaces forming the sides of the slot;

an elongate sleeve-bearing within the reinforcing rail having a slot aligned with the slot in the reinforcing rail;

a nut-bearing moveable along the reinforcing rail;

a projection on the nut extending through the aligned slots and engageable with the bearing surfaces;

threads on the nut-bearing engageable with the threads on the lead screw for moving the nut-bearing in reciprocating motion lengthwise of the rail when the lead screw is rotated wherein the nut-bearing threads are formed on the projection in an arc.

14. A reinforced lead screw assembly according to claim 13, comprising at least one flat extending lengthwise of the reinforcing rail and at least one mating flat in the nut-bearing to prevent the nut-bearing from rotating relative to the reinforcing rail.

15. A reinforced lead screw assembly according to claim 13, having a plurality of flats extending lengthwise of the reinforcing rail and mating flats in the nut-bearing to prevent the nut-bearing from rotating relative to the reinforcing rail.

16. An anti-backlash nut assembly on a reinforced lead screw comprising:

a threaded lead screw rotatable about a central axis;

a hollow, elongate reinforcing rail extending lengthwise of and surrounding the lead screw;

a slot in the reinforcing rail extending lengthwise of the central axis;

an anti-backlash nut assembly having a nut moveable along the reinforcing rail;

the anti-backlash nut comprising two separate nut portions;

each nut portion having a tongue extending radially through the slot and having threads engageable with the threads of the lead screw for moving both nut portions in reciprocating motion lengthwise of the rail when the screw is rotated;

a coiled torsion spring for forcing the nut portions apart to urge the flanks of their threads into forcible engagement with the threads of the lead screw to prevent backlash while the anti-backlash nut translates laterally along the reinforcing rail.

17. An anti-backlash nut assembly on a reinforced lead screw according to claim 16 wherein the torsion spring has tangs on each end, engageable, one each in the separate nut portions.

18. An anti-backlash nut assembly on a reinforced lead screw comprising:
- a threaded lead screw rotatable about a central axis;
- a hollow, elongate reinforcing rail extending lengthwise of and surrounding the lead screw;
- a slot in the reinforcing rail extending lengthwise of the central axis;
- an anti-backlash nut assembly having a nut moveable along the reinforcing rail;
- the anti-backlash nut comprising two separate nut portions;
- each nut portion having a tongue extending radially through the slot and having threads engageable with the threads of the lead screw for moving both nut portions in reciprocating motion lengthwise of the rail when the screw is rotated; and
- a coiled torsion spring for forcing the nut portions apart to urge the flanks of their threads into forcible engagement with the threads of the lead screw to prevent backlash while the anti-backlash nut translates laterally along the reinforcing rail.

19. An anti-backlash nut assembly on a reinforced lead screw according to claim 18, wherein the means for forcing the nut halves apart is a coiled torsion spring surrounding the reinforcing rail and wherein the torsion spring has tangs on each end, engageable, one each in the separate nut portions.

20. An anti-backlash nut assembly on a reinforced lead screw according to claim 18, wherein a tubular spacer is located between the compression spring and the reinforcing rail.

21. An anti-backlash nut assembly on a reinforced lead screw according to claim 18, wherein hubs are formed on each of the tongues and the threads which engage the threads of the lead screw are formed in the hubs.

22. An anti-backlash nut assembly on a reinforced lead screw according to claim 18, wherein the tongues are engageable with the sides of the slot to prevent rotation of the nut halves as they translate lengthwise of the lead screw.

23. An anti-backlash nut assembly on a reinforced lead screw according to claim 18, wherein the tongues are engageable with the sides of the slot to prevent rotation of the nut halves as they translate lengthwise of the lead screw.

24. An anti-backlash nut assembly on a reinforced lead screw according to claim 18, wherein a tubular spacer is located between the torsion spring and the reinforcing rail.

25. An anti-backlash nut assembly on a reinforced lead screw according to claim 18, wherein hubs are formed on each of the tongues and the threads which engage the threads of the lead screw are formed in the hubs.

* * * * *

UNITED STATES PATENT AND TRADEMARK OFFICE
CERTIFICATE OF CORRECTION

PATENT NO. : 6,415,673 B1
DATED : July 9, 2002
INVENTOR(S) : Keith W. Erikson and Kenneth W. Erikson It is certified that error appears in the above-identified patent and that said Letters Patent is hereby corrected as shown below:

Column 9,
Lines 5-25, delete Claim 18.
Line 27, delete "18" and insert -- 16 --.

Column 10,
Line 5, delete "18" and insert -- 16 --.
Line 9, delete "18" and insert -- 16 --.
Line 13, delete "18" and insert -- 16 --.
Line 17, delete "18" and insert -- 16 --.
Line 21, delete "18" and insert -- 16 --.
Line 24, delete "18" and insert -- 16 --.

Signed and Sealed this

Seventeenth Day of December, 2002

JAMES E. ROGAN
*Director of the United States Patent and Trademark Office*